United States Patent [19]

Kerivan

[11] Patent Number: 4,706,861

[45] Date of Patent: Nov. 17, 1987

[54] PERFORATED WEB FEEDING APPARATUS

[75] Inventor: Leo J. Kerivan, Somerset, Mass.

[73] Assignee: Precision Handling Devices, Inc., Fall River, Mass.

[21] Appl. No.: 913,830

[22] Filed: Sep. 30, 1986

[51] Int. Cl.[4] .................... G03B 1/30

[52] U.S. Cl. .................... 226/74

[58] Field of Search .................... 226/74, 75, 87

[56] References Cited

U.S. PATENT DOCUMENTS

| | | | |
|---|---|---|---|
| 4,129,239 | 12/1978 | Hubbard | 226/75 |
| 4,611,737 | 9/1986 | Hubbard et al. | 226/74 |
| 4,643,603 | 2/1987 | Hauslaib | 226/74 |

*Primary Examiner*—Stuart S. Levy
*Assistant Examiner*—Steven Dubois
*Attorney, Agent, or Firm*—Martin LuKacher

[57] ABSTRACT

Web feeding apparatus which may be in the form of a tractor which feeds perforated webs, such as perforated paper in a computer printer, typewriter or the like has a frame which locates a belt having pins projecting from the belt which enter the perforations in the paper and drive the paper when the belt is driven, as by a sprocket which is journalled in the frame. In the closed position, the lid overlies the belt and presents a surface adjacent the belt which is separated by a gap through which the paper passes when it is engaged with the pins. The paper also overlies the surface of the inside side plate. The gap spacing (the distance which separates the surface of the belt on which the paper is disposed) is set automatically by a gap setting member which projects from the lid and is biased with the lid into engagement with the paper when the lid is in closed position and the belt is in driving relationship with the paper. The gap setting member may be a rib or runner projecting downwardly from the lid and extending along the surface of the inside side plate.

18 Claims, 5 Drawing Figures

PERFORATED WEB FEEDING APPARATUS

DESCRIPTION

The present invention relates to apparatus which is useful in feeding perforated webs and particularly edge perforated paper.

The invention is especially suitable for use in tractors which feed perforated webs as in computer printers, typewriters and alike.

The invention is an improvement upon web feeding and tractor apparatus which is of the type described in U.S. Pat. Nos. 3,825,162; 4,129,239; 4,457,463; 4,611,737 and 4,614,508. In such apparatus, a lid has a surface which is spaced from the web driving member, which is a belt having pins projecting therefrom in a perforated paper feed tractor. The gap spacing is desirably minimized in order to afford accurate feeding of paper, particularly where the feed is step wise at high acceleration, as discussed in U.S. Pat. No. 4,611,737. Attempts to force the belt toward the lid so that the paper is spaced from the lid by the thickness of the paper present difficulty due the the increased frictional drag on the paper. U.S. Pat. No. 4,462,531 shows a tractor wherein the belt is biased upwardly against the lid and gives rise to frictional forces which can imposed significant loads on the drive motor.

It has been found, in accordance with the invention, that the paper may be used as a gage to automatically set the gap spacing. This spacing may be such as to locate the paper so that it is substantially at the pitch line of the belt. There is sufficient clearance in regions of the tractor where the frictional forces may be high, to prevent any significant load on the motor which drives the belt. Gaging and adjustment of the spacing between the lid and the belt may be eliminated in the manufacture of the tractor, thereby reducing the cost of the manufacture.

Accordingly, it is the object of the present invention to provide improved perforated web feeding apparatus wherein the perforated web is fed through a gap between a web drive member and a lid or other web guide wherein the gap is set automatically in accordance with the thickness of the paper without giving rise to frictional forces significant enough to interfere with web feeding operations.

It is a more particular object of the present invention to provide an improved perforated paper feed tractor wherein the gap spacing the belt from the surface of the lid adjacent to the belt is set automatically in accordance with the thickness of the paper without exerting a load on the drive motor for the tractor which can significantly effect the operation of the tractor.

It is a still further object of the present invention to provide an improved perforated paper feed such as a tractor or the like wherein the clearance between a lid or other guide member and the web is set automatically in operation of the device and without the need for gaging and adjustment of during manufacture.

Briefly described, apparatus for feeding of perforated webs in accordance with the invention has a web drive member with pins which enter and engage the web in the perforations thereof. The web drive member is movably mounted in a frame. The frame has inside and outside portions. The inside portion extends alongside the drive member and present a surface on which the web is disposed when the web is engaged with the drive member. A lid (which term includes any equivalent guide) is pivotally mounted on the outside portion of the frame and is rotated about its pivot axis between open position and closed position. In closed position, the lid overlies the drive member and the frame. The lid presents a surface overlying the drive member which is adapted to be separated therefrom by a gap when the lid is in closed position. A rib or ribs may extend from the lid, as described in U.S. Pat. No. 4,611,737, so as to locate the web substantially at the pitch line of the drive member. The lid has a gap distance setting member which projects a predetermined distance from the lid surface. This member may be a rib or a roller and sets the gap spacing between the lid surface and the drive member in accordance with the thickness of the web. The gap setting member may be opposed to at least a portion of the surface of the inside portion of the frame. The lid is biased toward the drive member when the lid is in closed position so as to bring the gap setting member against the web and against the portion of the surface of the inside portion of the frame which cooperates in setting the gap spacing. The gap spacing is automatically set in accordance with the thickness of the web. The gap setting member may be a roller, in which case the roller is desirably located near the end of the lid where the web enters the apparatus and is engaged by the drive member. The surface of the inside portion of the frame which cooperates with the roller gap setting member may be alternatively provided by another roller. Then the web enters in the nip between the rollers. The frictional forces are low due to the lever arm between the axis of rotation of the lid being longer than the lever arm between the axis of rotation and the point along the lever arm where the biasing force is applied, as by a spring. If further reductions in force are required, the inside portion of the frame may be extended, as with a platform, in the inside direction.

The foregoing and other objects, features and advantages of the invention as well as presently preferred embodiments thereof will become more apparent from a reading of the following description in connection with the accompanying drawings in which.

Figure 1:
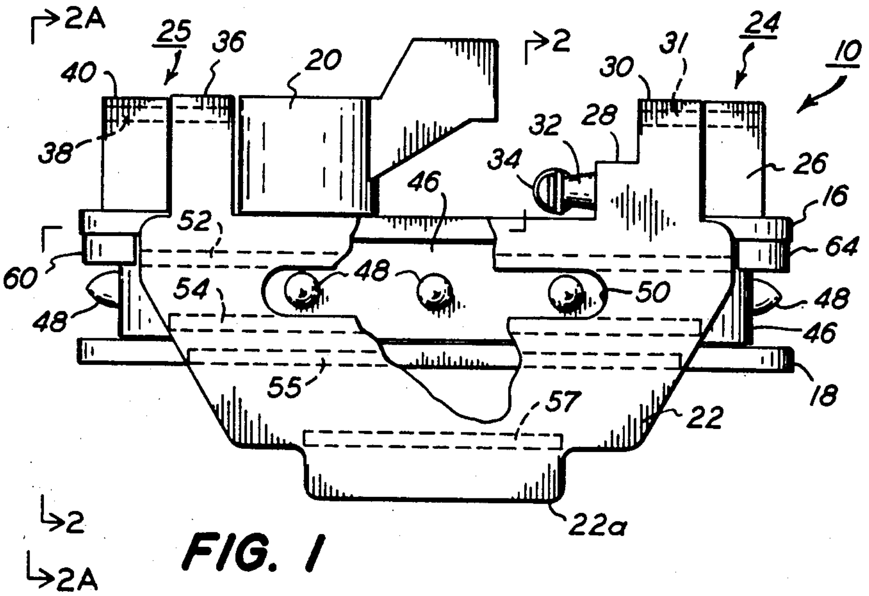
FIG. 1 is a plan view of a paper feed tractor which embodies the invention.
Figure 2:
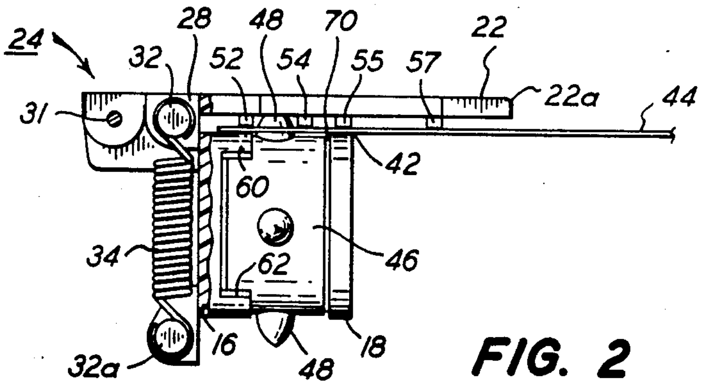
FIG. 2 is an end view of the tractor shown in FIG. 1, the view being taken along the line 2—2 in FIG. 1.
Figure 3:
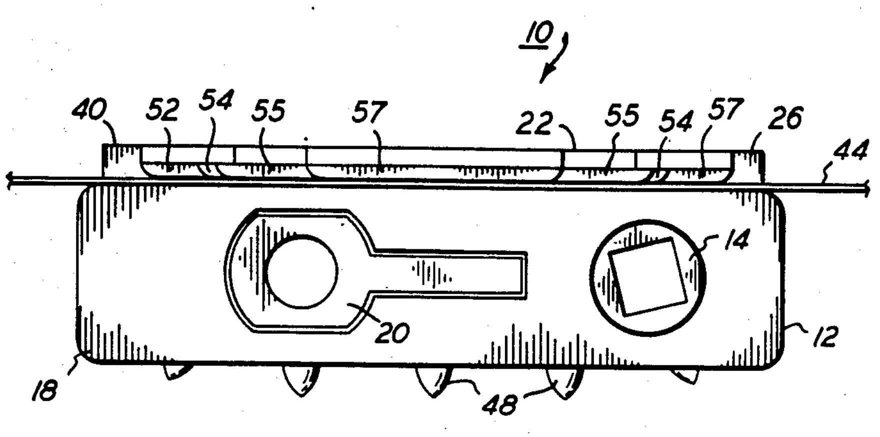
FIG. 3 is a side view of the tractor apparatus shown in FIG. 1.

Referring to FIGS. 1, 2 and 3, there is shown a perforated paper feed tractor 10 of the type described in U.S. Pat. No. 3,825,162. The tractor 10 has a frame 12 with a outside side plate 16 and an inside side plate 18. These side plates are assembled together and define a journal for a sprocket 14. This sprocket has a square hole which receives a drive shaft (not shown). The drive shaft is connected through suitable gearing to a stepper drive motor. The sprocket has slots or receptacles which receive lugs 49 (see FIG. 4) of an endless belt of flexible material. Pins 48 project upwardly from the belt 46 and may be integral with the lugs 49. The belt 46 with its pins 48 and 49 may be constructed in the manner described in the above referenced Pat. Nos. 3,825,162 and 4,611,737. The side plates have surfaces which support the belt and set its position both vertically and edgewise in the frame 12, also as more fully described in the Patents just above mentioned. These surfaces extend around the end of the tractor opposite to the end having the sprocket 14. The outside side plate 18 has at the ends thereof pairs of inward projections which act as strippers to facilitate the entry and release of the perforated paper 44. Two of these strippers 60 and 62 of the set at the left-hand end of the tractor are shown in FIG. 2. One of the strippers 64 at the right-hand end of the tractor is shown in FIG. 1.

A floating clamp mechanism 20 for the support shaft on which the tractor is mounted together with another tractor so as to feed perforations on each of the edges of the paper may be of the type described in U.S. Pat. No. 4,129,239. The clamp rotates between locked and unlocked positions; one of which is defined by stops 21*a* and 21*b* on the clamping mechanism 20 and on the outside side plate 16, respectively (see FIG. 2A).

Figure 4:
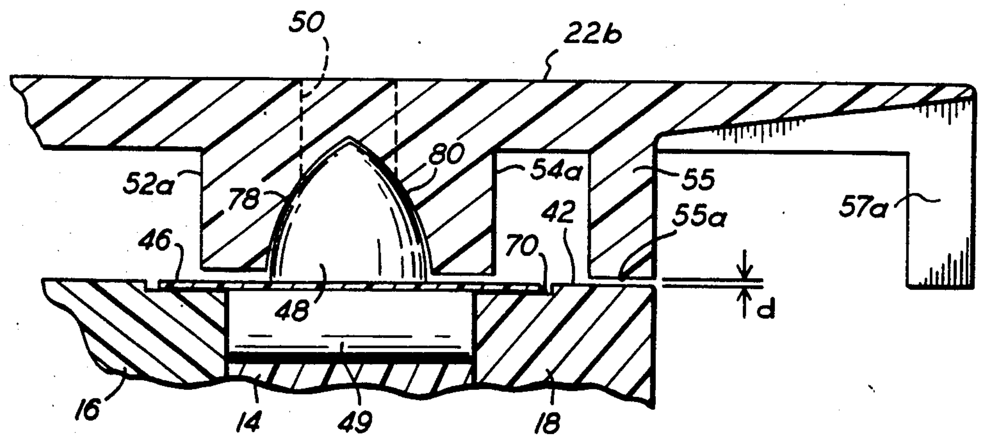
FIG. 4 is an enlarged fragmentary sectional view through the axis of the journal of the sprocket of a tractor similar to the tractor shown in FIGS. 1, 2 and 3 and having ribs adjacent to the path of the pins where the pins are in engagement with the perforations in the web; the surfaces of these ribs being of arcuate shape conjugate to the shape of the pins.

The flexible strip of plastic material of the endless belt may be located between the upper surfaces of the edges of the side plates 16 and 18 in a slight depression 70 (see FIGS. 2 and 4). This depression is optional and is used to locate the paper 44 more exactly with respect to the belt 46. The belt in any event is essentially coplanar with the surfaces of the upper end of the side plates 16 and 18. The pitch line of the belt is essentially at the upper surface thereof since the belt is very thin (only a few mils). The upper surface 42 of the inside side plate 18 presents a reference surface for setting the lid gap as will be explained in greater detail below.

The tractor 10 has a lid 22 which is pivotally mounted to the outside side plate 18 by hinge assemblies 24 and 25. These hinge assemblies include lugs 26 and 40 which project outwardly from the back of the outside side plate 16. The lid has rearward extensions 30 and 36. The extension 30 has a hole for receiving a pin 31 of the hinge assembly 24. The projection 40 has a hole which receives a pin 38. The pins extend in the same direction to facilitate assembly of the lid on the tractor. The projection 30 has a stepped part 28 from which a lug 32 with a collar extends. A similar lug and collar 32*a* projects parallel to the axis of the lug and collar 32 from the outside side frame directly below the lug and collar 32. A spring 34 is connected by eyelet loops at the opposite ends thereof to these lugs and is captured by the collars at the ends thereof. The lugs 32 are disposed inside of the axes of the pins 31 on which the lid 22 rotates. The lid may be manually moved by manual engagement with the lip 22*a* on the inside end thereof between a closed position as shown in the drawing and an open position over 180 degrees counterclockwise from that shown in FIG. 2.

The lid has a pair of ribs 52 and 54 which extends over the lineal path where the paper 44 is engaged with the belt 46. These ribs project a sufficient distance to locate the paper 44 substantially at the pitch line of the belt 46 as is described in U.S. Pat. No. 4,611,737. The lower end surfaces of these ribs 52 and 54 provide the surfaces of the lid which define the lid gap between the lid and the belt 46. The lid gap spacing or the distance between the surfaces of the ribs 52 and 54 and the belt is suitably between 8 and 10 mils. The inside rib 54 may be closer to the belt than the outside rib 52 because of the manner in which the lid gap spacing is set. Then, for example, the spacing between the end surface of the rib 54 and the belt 46 may be 8 mils, while the spacing between the rib 52 and the belt may be 10 mils. This spacing is nominal for single ply paper. This spacing is constant for multi-part perforated forms of the type which are often used in computer printers, even though the gap (d, FIG. 4) increases.

The lid gap spacing is set at the distance d as shown if FIG. 4 by the member 55. This member 55 is a rib which extends along the lid parallel to the other ribs 52 and 54 and parallel to the path of the pins 48. The rib 55 may be viewed as a runner parallel to the inside side plate 18. The rib 55 project towards the frame a distance such that the requisite gap spacing is automatically set (gaged) by the thickness of the paper.

The width of the rib 55 is less than the width of the surface 42 and is located on the inside of the surface, along the inside edge. The location of the rib 55 takes advantage of the mechanical advantage due to the ratio of the lever arm along the lid between the point where spring force is applied (at the lug 32, FIG. 2) and the pivot axis of the pins 31 and 38, and between the pivot axis of the pins 31 and 38 and the rib 55. The ratio of these lever arms may be approximately 1 to 5, thereby reducing the force biasing the lid downwardly at the lug by a factor of 5. A typical spring force in a small 4-pin (4 pins in engagement with 4 perforations during feeding) may be approximately 4½ pounds. This force is reduced to less than 1 pound. Considering that the coefficient to friction between the plastic material (polycarbonate) typically used to fabricate the frame 12 is about 0.22, the drag and the load force is reduced considerable to less than ¼ of a pound. This load does not provide a significant effect on the operation of the tractor drive (the stepper motor and gears). If the ribs 52 and 54 were used to gage the lid gap, the force would be more than twice as high. The frictional drag could then adversely effect paper feeding operations.

As shown in FIG. 4, the surface 55A at the end of the rib 55 would be spaced the distance d (the thickness of the web) from the referenced surface 42 of the inside side plate 18 which distance would vary depending upon the thickness of the paper. The rib 55 runs along the surface 42. The force may be further reduced by providing an inward extension of the inside side plate 18, for example a platform extending the surface 42 inwardly. Then the rib 55 could be located further inwardly and increase the mechanical advantage, thereby still further reducing the frictional forces.

The lid 22 has an outside rib 57 (FIG. 2) or 57A (FIG. 4) which defines a notch in the lid into which a "paper-out" switch may be located. The upper end of the notch may be tapered (FIG. 4) to locate the lever of the "paper-out" switch.

Figure 2A:
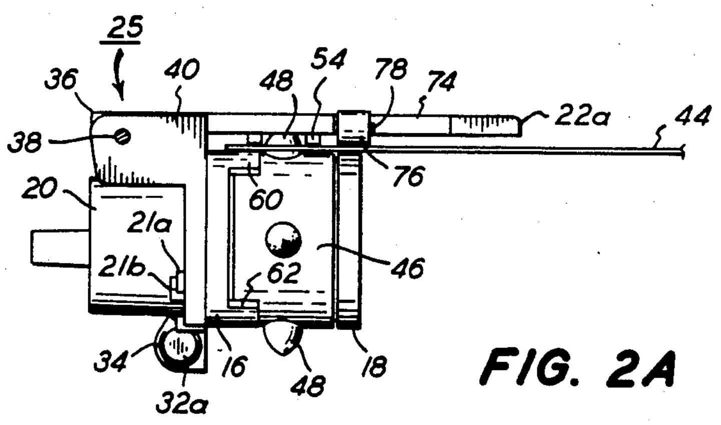
FIG. 2A is an end view of a tractor similar to that shown in FIG. 1, wherein like parts are identified by like reference numerals, taken along the line 2A—2A, and showing a tractor in accordance with another embodiment of the invention.

Alternatively, as shown in FIG. 2A, the end of the lid 22 adjacent to the infeed end (left-hand end as shown in FIGS. 1 and 3) of the tractor where the paper enters the tractor may be provided with a cut-away section so as to receive a roller 76. The roller is journalled to the lid by a pin 78. The roller radius is selected to define the lid gap spacing. The roller still further reduces the frictional drag due to the contact with the paper. To still further reduce the frictional drag, another roller may be mounted opposing the roller 76 and having a location and radius to define the reference location (in the plane of the surface 42). The roller mounted on the frame then provides the surface of the inside side plate which cooperates in setting the gap spacing. The paper then enters into the nip between the two rollers, still further reducing the frictional drag.

As shown in FIG. 4, ribs 52*a* and 54*a* are provided which extend closely adjacent to the path of the pins 48 with a slight clearance between the surfaces 78 and 80 of the ribs 52*a* and 54*a* along side the pins. These surfaces are arcuate and conjugate (concave where the pin surfaces are convex) to the surfaces of the pins. These surfaces may be of involute shape. Alternatively, where the pin is provided with a flat, as discussed in U.S. Pat. No. 4,611,737, the portion of the surface 78 or 80 opposite to the flat of the pins is also flat. It will be observed in FIGS. 1 and 4 that a slot 50 is provided through the lid in the center portion thereof through which the upper ends of the pins extend.

From the foregoing description it will be apparent that there has been provided improved web feeding apparatus. While the invention has been described in its preferred embodiments in connection with tractor apparatus, other web feeding apparatus, for example utilizing pinwheels may be adapted to take advantage of the invention. Other variations in modifications within the scope of the invention will undoubtedly suggest themselves to those skilled in the art. Accordingly, the foregoing description shall be taken as illustrative and not in a limiting sense.

I claim:

1. Apparatus for feeding a perforated web which comprises a web drive member having pins which enter and engage the web in its perforations, a frame in which said web drive member is moveably mounted, said frame having inside and outside portions, said inside portion having a surface along side said drive member upon which said web is disposed when said web is engaged with said drive member, a lid pivotally mounted on said outside portion about an axis and being rotatable between open position and closed position respectively, away from and overlying said drive member and said frame, said lid presenting a surface overlying said drive member which is adapted to be separated therefrom by a gap when said lid is in closed position, said lid having a gap distance setting member projecting a predetermined distance from said lid surface in the direction of said frame to engage said web when said lid is in closed position to set said distance in accordance with the thickness of said web, the surface of said lid overlying said frame being spaced from said frame when said lid is in closed position, said gap setting member being opposed to at least a portion of said surface of said inside portion of said frame, and means biasing said lid towards said drive member when said lid is in closed position to bring said gap setting member against said web and said portion of said surface of said inside portion of said frame.

2. The apparatus according to claim 1 wherein said frame extends along said drive member, and said gap setting member is a rib also extending along said drive member when said lid is in the closed position.

3. The apparatus according to claim 1 wherein said member is a roller journalled to said lid.

4. The apparatus according to claim 1 wherein said apparatus is a tractor, said drive member is a flexible endless belt, said inside and outside portions of said frame being the inside and outside side plates of said frame of said tractor.

5. Tractor apparatus according to claim 4 wherein said side plates have edges extending along said belt, said surface of said inside portion being the surface of the edge of said inside side plate.

6. Tractor apparatus according to claim 5 wherein said lid has at least one rib extending along the side the path of said pins and projecting downwardly toward said drive member when said lid is in closed position, said rib having an end the surface of which is opposed to said drive member, said end surface being at least part of the surface of said lid which is separated from said drive member by said gap.

7. Tractor apparatus according to claim 6 wherein said drive member has a pitch line, the surface of said end of said rib projecting toward said drive member a sufficient distance to locate said web approximately at said pitch line when said lid is in closed position with said gap distance set by said gap setting member.

8. Tractor apparatus according to claim 7 wherein said other of said ribs also has and end surface which is part of the surface of said lid which is separated from said drive member by said gap, said end surface of said other rib also projecting a sufficient distance to locate said web substantially at the pitch line of said drive member when said lid member is in closed position with said gap distance set by said gap setting member.

9. Tractor apparatus according to claim 6 wherein said rib has a side surface along said path of said pins, said side surface having an arcuate shape conjugate to the shape of said pins.

10. Tractor apparatus according to claim 9 wherein another rib projects from said lid parallel to said first named rib and also having a side surface along the opposite side of said pin path, said side surface of said other rib having an arcuate shape conjugate to the shape of said pins.

11. Tractor apparatus according to claim 9 wherein said side surface of said rib is spaced closely adjacent to said pins.

12. Tractor apparatus according to claim 11 wherein said side surface of said other rib is also spaced closely adjacent to said pins.

13. Tractor apparatus according to claim 6 wherein another rib projects from said lid parallel to said first named rib and disposed on the opposite side of the path of said pins from said first named rib.

14. Tractor apparatus according to claim 5 wherein said gap setting member is a rib extending along at least a portion of said edge of said inside side plate.

15. Tractor apparatus according to claim 14 wherein said rib has a width less than the width of said edge disposed along the inside of said edge when said lid is in closed position.

16. Tractor apparatus according to claim 5 wherein said gap setting member is at least one roller journalled to said lid and disposed of the end of said lid adjacent to the end of said frame where said web enters said tractor.

17. The apparatus according to claim 1 wherein said biasing means is connected to said lid inside said axis.

18. Apparatus according to claim 17 wherein said biasing means is a spring.

* * * * *